US012743098B2

(12) United States Patent
Lev

(10) Patent No.: US 12,743,098 B2
(45) Date of Patent: Sep. 22, 2026

(54) MONOCULAR OBSTACLE DETECTION ON A DRONE FLIGHT PATH

(71) Applicant: NEC Corporation Of America, Herzlia (IL)

(72) Inventor: Tsvi Lev, Tel-Aviv (IL)

(73) Assignee: NEC Corporation Of America, Herzlia (IL)

( * ) Notice: Subject to any disclaimer, the term of this patent is extended or adjusted under 35 U.S.C. 154(b) by 85 days.

(21) Appl. No.: 18/675,256

(22) Filed: May 28, 2024

(65) Prior Publication Data

US 2025/0370466 A1 Dec. 4, 2025

(51) Int. Cl.

*G05D 1/622* (2024.01)
*G05D 1/65* (2024.01)
*G05D 109/20* (2024.01)
*G05D 111/10* (2024.01)
*G06V 10/25* (2022.01)
*G06V 20/17* (2022.01)

(52) U.S. Cl.

CPC ............... *G05D 1/622* (2024.01); *G05D 1/65* (2024.01); *G06V 10/25* (2022.01); *G06V 20/17* (2022.01); *G05D 2109/20* (2024.01); *G05D 2111/10* (2024.01)

(58) Field of Classification Search

CPC ...... G05D 1/622; G05D 1/65; G05D 2109/20; G05D 2111/10; G06V 10/25; G06V 20/17

See application file for complete search history.

(56) References Cited

U.S. PATENT DOCUMENTS

2018/0032042 A1* 2/2018 Turpin ................. H04N 13/296
2018/0204469 A1* 7/2018 Moster ..................... G08G 5/34
2018/0345958 A1* 12/2018 Lo ......................... B60W 30/09
2019/0073912 A1* 3/2019 Mellinger, III .......... G08G 5/57
2019/0138029 A1* 5/2019 Ryll .......................... G06T 7/73
2019/0163206 A1* 5/2019 Zhu ........................ B64U 60/50
2019/0174149 A1* 6/2019 Zhang ................ H04N 21/4728
2019/0304120 A1* 10/2019 Ma ........................ G06V 20/58

* cited by examiner

*Primary Examiner* — Dale W Hilgendorf
*Assistant Examiner* — Frank T Glenn, III

(57) ABSTRACT

A method, apparatus, and computer program product for monocular obstacle detection on a drone flight path. A drone is instructed to move forward at a constant horizontal speed and concurrently perform a planned motion in at least one perpendicular direction. A monocular camera mounted on the drone is operated to capture one or more image pairs comprising at least a first frame captured along the flight path and a second frame captured at a deviation from the flight path effected by the planned motion. The first and second frames are analyzed to determine stereo matching and according thereto estimate a motion vector between the first and second frames for at least one region of interest. In response to determining according to the motion vector that an obstacle is present on the flight path, at least one obstacle detection response pattern is applied.

19 Claims, 6 Drawing Sheets

MONOCULAR OBSTACLE DETECTION ON A DRONE FLIGHT PATH

BACKGROUND

Some embodiments described in the present disclosure relate to collision detection and, more specifically, but not exclusively, to obstacle detection on a drone flight path using a monocular imaging sensor.

Unmanned Aerial Vehicles (UAVs), commonly known as "drones," are aerial vehicles that operate without a human operator on board. They can fly autonomously or be piloted remotely. In recent years, these autonomously or remotely operated aircrafts have emerged as versatile tools with wide-ranging applications across various industries. To name just a few, non-exhaustive examples, drones have revolutionized traditional practices in fields such as agriculture, surveillance, infrastructure inspection, filmmaking, and logistics, among others. Drones play a crucial role in various sectors, and their adoption is projected to grow exponentially as technology advances and regulations evolve.

The evolution of drone technology has been propelled by significant advancements in miniaturization, sensor integration, battery efficiency, and computational capabilities. These advancements have led to the development of drones that are more compact, agile, and capable of carrying sophisticated payloads while operating for extended durations.

One of the primary driving factors behind the proliferation of drones is their ability to access remote or hazardous environments with minimal risk to human operators. This capability has made drones indispensable tools for tasks such as search and rescue operations, environmental monitoring, and disaster response.

Furthermore, the integration of advanced imaging technologies, including high-resolution cameras, multispectral sensors, and Light Detection and Ranging (LiDAR) systems, has empowered drones to gather and analyze vast amounts of data with unprecedented accuracy and efficiency. This data acquisition capability has found applications in fields such as, for example, precision agriculture, land surveying, and three dimensional (3D) mapping, enabling users to make informed decisions based on real-time insights.

Moreover, the advent of artificial intelligence (AI) and machine learning algorithms has augmented the autonomy and intelligence of drones, enabling them to perform complex tasks autonomously, such as object detection, path planning, and obstacle avoidance. This autonomy is particularly valuable in scenarios where real-time decision-making and rapid response are critical, such as in surveillance, security, and delivery operations.

SUMMARY

It is an object of the present disclosure to describe a system and a method for monocular obstacle detection on a drone flight path.

The foregoing and other objects are achieved by the features of the independent claims. Further implementation forms are apparent from the dependent claims, the description and the figures.

According to one aspect of some embodiments of the disclosed subject matter there is provided a method for monocular obstacle detection on a drone flight path, comprising: instructing a drone to move at a constant speed on a flight path directed forward along a horizontal axis; instructing the drone while moving at the constant speed forward on the flight path to perform a planned motion in at least one direction perpendicular to the horizontal axis; operating a monocular camera mounted on the drone to capture at least one pair of images, each pair comprising a first frame captured along the flight path and a second frame captured at a deviation from the flight path effected by the planned motion performed in the at least one direction; analyzing the first and second frames of a respective one of the at least one pair to determine stereo matching; estimating for at least one region of interest a motion vector between the first and second frames according to the stereo matching; and in response to determining according to the motion vector that an obstacle is present on the flight path, applying at least one obstacle detection response pattern.

According to another aspect of some embodiments of the disclosed subject matter there is provided an apparatus for monocular obstacle detection on a drone flight path, comprising: a processing circuitry adapted for: instructing a drone to move at a constant speed on a flight path directed forward along a horizontal axis; instructing the drone while moving at the constant speed forward on the flight path to perform a planned motion in at least one direction perpendicular to the horizontal axis; operating a monocular camera mounted on the drone to capture at least one pair of images, each pair comprising a first frame captured along the flight path and a second frame captured at a deviation from the flight path effected by the planned motion performed in the at least one direction; analyzing the first and second frames of a respective one of the at least one pair to determine stereo matching; estimating for at least one region of interest a motion vector between the first and second frames according to the stereo matching; and in response to determining according to the motion vector that an obstacle is present on the flight path, applying at least one obstacle detection response pattern.

According to yet another aspect of some embodiments of the disclosed subject matter there is provided a computer program product comprising: a non-transitory computer readable storage medium; program instructions for executing, by a processor, a method for monocular obstacle detection on a drone flight path, the method comprising: instructing a drone to move at a constant speed on a flight path directed forward along a horizontal axis; instructing the drone while moving at the constant speed forward on the flight path to perform a planned motion in at least one direction perpendicular to the horizontal axis; operating a monocular camera mounted on the drone to capture at least one pair of images, each pair comprising a first frame captured along the flight path and a second frame captured at a deviation from the flight path effected by the planned motion performed in the at least one direction; analyzing the first and second frames of a respective one of the at least one pair to determine stereo matching; estimating for at least one region of interest a motion vector between the first and second frames according to the stereo matching; and in response to determining according to the motion vector that an obstacle is present on the flight path, applying at least one obstacle detection response pattern.

Optionally, the planned motion is periodic.

Optionally, at least one parameter of the planned motion is adjusted in response to determining according to the motion vector that an obstacle is potentially present on the flight path.

Optionally, the determining according to the motion vector that the obstacle is present on the flight path comprising performing a comparison between a magnitude of the motion vector and a threshold.

Optionally, the method further comprising and/or the processing circuitry is further adapted for: determining a confidence level of the motion vector estimated; and performing a comparison between the confidence level and a threshold, wherein the determining according to the motion vector that the obstacle is present on the flight path is subject to the confidence level exceeding the threshold.

More optionally, at least one parameter of the planned motion is adjusted in response to the confidence level not exceeding the threshold.

Optionally, the at least one region of interest comprising a neighborhood of a center of a field of view of the monocular camera.

Optionally, the at least one obstacle detection response pattern comprising a member selected from the group consisting of: instructing the drone to perform an obstacle avoidance maneuver; instructing the drone to change at least one of a speed and a course of the drone; and outputting an alert.

Optionally, the monocular camera is of a type selected from the group consisting of: a visible light camera; and a thermal infrared camera.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

Figure 4:
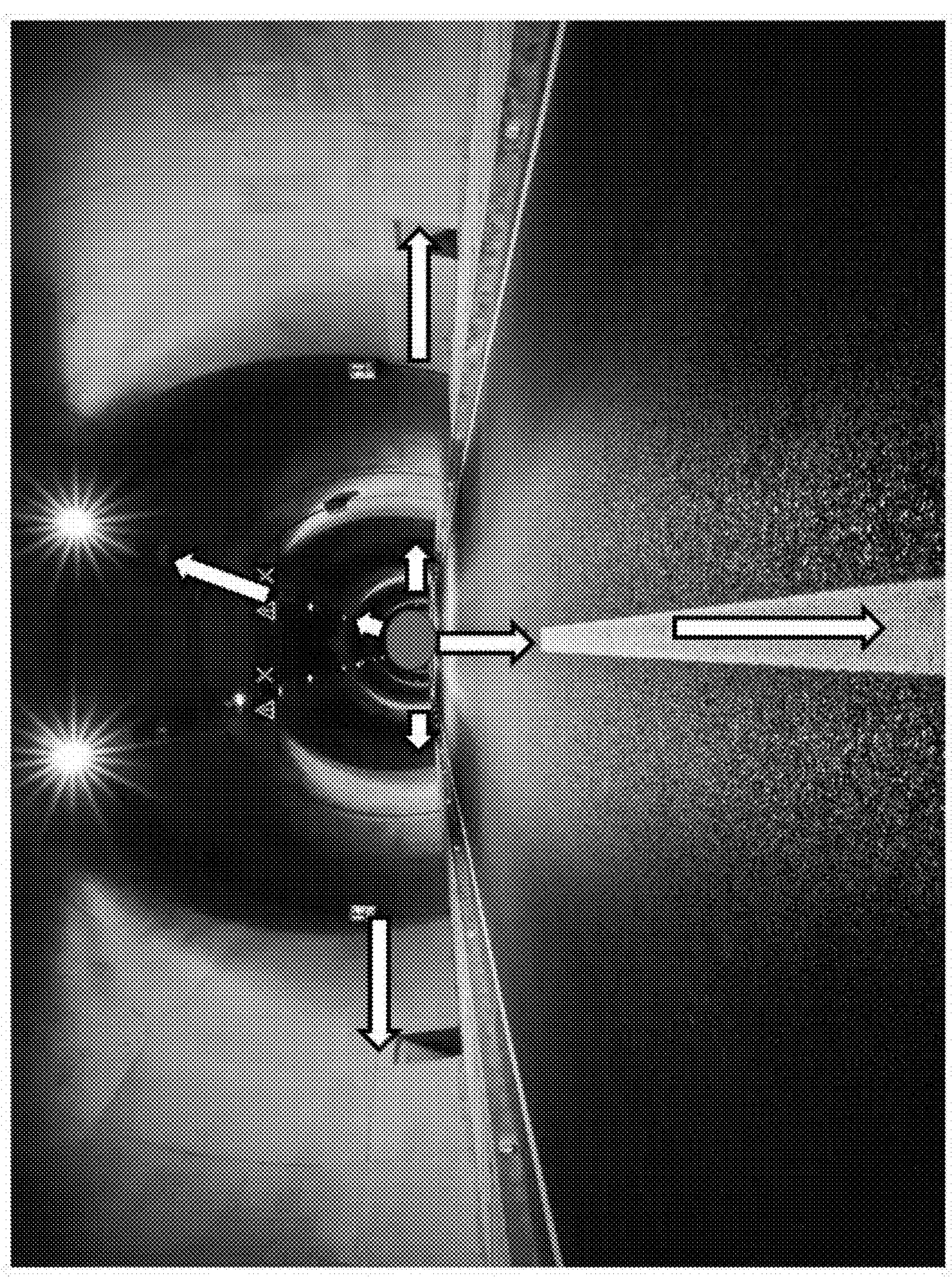
Figure 5:

FIG. 4 is a schematic illustration of estimated motion vectors for monocular obstacle detection on a drone flight path as obtained in an exemplary scenario of no obstacle present, according to some embodiments; and FIG. 5 is a schematic illustration of estimated motion vectors for monocular obstacle detection on a drone flight path as obtained in an exemplary scenario of an obstacle present, according to some embodiments.

DETAILED DESCRIPTION

Some embodiments described in the present disclosure relate to collision detection and, more specifically, but not exclusively, to obstacle detection on a drone flight path using a monocular imaging sensor.

The need to avoid collisions for autonomously or remotely operated moving objects, such as robots and/or unmanned vehicles and aircrafts, e.g., drones, is omnipresent.

One common group of solutions uses active sensors such as ultrasonic transducers, front Light Detection and Ranging (LiDAR), short wave Radio Detection and Ranging (RADAR), and/or the like to detect nearby objects in the motion path.

Another pre-existing approach is to use passive optical imaging, such as stereo cameras and/or the like, to gauge three dimensional (3D) distance, and estimate object existence and distance.

With monocular imaging, i.e., by a single forward-looking camera, object detection can be performed using motion of a platform on which the camera is mounted and multiple frames captured during it to estimate corresponding image patches between frames and their respective visible motion vectors, indicating relations among one or more 'foreground' objects and 'background' portions of an imaged scene.

A method often used in high altitude flight is to monitor (by a human or automated system) the 'horizon' in front of the aircraft vehicle (e.g., plane, drone, and/or the like), namely, the line at which the earth's surface and the sky appear to meet. However, in low altitude flight, objects in front of the aircraft may often appear 'below the horizon' as there are taller, distant objects behind them. For example, a telephone pole may be in the flight path but behind it there may be a tall building, or a small hill may be nearby but below the visible horizon due to mountains in the distance behind it.

One technical challenge dealt with by the disclosed subject matter is to provide for monocular collision detection and avoidance which may be applicable and useful even for low flying drones and/or likewise scenarios.

In some embodiments, a drone may be instructed to perform, while moving forward at some constant horizontal speed, a planned motion at a direction perpendicular to its flight path, e.g., laterally (to the left or right) or vertically (upward or downward). The motion may be relatively limited, namely not deviating excessively from the original flight path. Optionally, the motion may be periodic. Additionally or alternatively, several planned motions at different directions may be performed interchangeably. A monocular imaging sensor (e.g., a camera) mounted on board of the drone may be used to capture two or more images or video frames at different times during the course of a respective planned motion and/or the constant speed horizontal forward flight preceding and/or succeeding it. The planned motion thus performed by the drone effectively creates a 'stereo' relationship or effect between the frames taken at different times by the monocular camera mounted on the drone, allowing derivation of depth information for imaged objects.

Since the additional motion of the planned deviation is perpendicular to the main motion direction of the drone flight path, it allows for stereo imaging even for objects directly in the path of the drone, which are exactly the ones that need measurement for collision detection and avoidance.

As successful stereo matching between images may also depend on the visual characteristics of the object (e.g. shiny, smooth, complex texture, and/or the like), the perpendicular motion in various directions allows for multiple different views of the potential object and hence may contribute to successful detection.

In case there is no object present at a short distance in the path of the drone, the stereo imaging from various angles may yield no motion and/or no visible changes in a small region directly in the middle of the field of view and/or forward motion direction.

Optionally, the perpendicular motion parameters, such as direction, frequency, amplitude, and so forth, may be changed dynamically to reflect results of previous object detection. For example, if some signs of 'potential object' are detected, the motion may be extended, drone forward speed may be reduced, and/or the like.

In some embodiments, a match score may be computed for a candidate correspondence between frames, denoting a measure of goodness or quality of the match, i.e., a level or degree of confidence in its accuracy, robustness, and/or the like. The match score or confidence level may be used to inform and guide decisions as to whether an obstacle may be present or not, and/or if additional frames and/or other viewing angles may be required for improving detection likelihood. The perpendicular motion parameters may be adjusted accordingly until the confidence level is satisfactory and/or other detection criteria are met, e.g., a visible motion vector estimated for a relevant imaged area around a center of the forward motion direction is of a magnitude that is large enough, and/or the like.

For example, in case that an object such as a shiny metal pole, with distinct edges and shape, is positioned straight ahead in the flying path of the drone, it may be reasonably expected that a match with a relatively high score would be quite easily located for the respective image patch of this object between different frames, as it is distinct, and especially if the drone moves laterally to the right and/or left to capture the different frames for detecting it. On the other hand, fuzzy or blurred objects, such as clouds, smoke, and/or the like, may yield in very poor matches between the frames, which accordingly may prompt one to try and improve the depth assessment by changing the perpendicular motion, e.g., increasing its sideways and/or vertical amplitude(s) etc.

In some embodiments, an alternative approach may be taken where, instead of using matching of images to compute a match score, an alert may be provided when there are no matches found. It will be appreciated that, if there is no nearby object in the direct path of the drone motion, frames with small time differences (e.g. 100 msec or less) between them should not show much change in the field of view directly in the motion direction. If matching fails, this could indicate a fuzzy and/or moving object nearby, e.g., a tree canopy, a moving airplane, heavy smoke or fog with wind, and/or the like. Hence, such a failure to match patches may also trigger a change in the perpendicular motion performed by the drone to improve range detection (i.e., disparity mapping).

As used herein, the term "stereo matching", also commonly referred to as stereo vision or reconstruction, relates to a process for extraction of 3D information from monocular images of a scene taken from two vantage points, by examining the relative positions of objects in the two panels. In traditional stereo vision, two cameras, displaced horizontally from one another (i.e., 'left' and 'right'), are used to obtain two differing views on a scene, in a manner similar to human binocular vision. By comparing these two images, the relative depth information can be obtained in the form of a disparity map, which encodes the difference in horizontal coordinates of corresponding image points (i.e., the difference in the position of an object as seen by the left and right cameras respectively). The values in this disparity map are inversely proportional to the scene depth at the corresponding pixel location, namely, the object's distance from the cameras, i.e., greater disparity indicates a closer object and vice versa.

Stereo matching may begin at image rectification, for aligning the images so that corresponding points are on the same horizontal line. This simplifies the search for correspondences to a one-dimensional problem. The correspondence search for finding matching pixels between the left and right images may be done using local methods, where small image patches or windows around pixels along a scan line are compared, by approaches such as sum of absolute differences (SAD), sum of squared differences (SSD), normalized cross-correlation (NCC), and/or the like. Additionally or alternatively, global methods may be used, where the entire image may be considered to find correspondences, often using optimization techniques such as graph cuts, dynamic programming, belief propagation, and/or the like. The disparity may then be determined for each pixel by finding the best match, i.e., the difference or motion in pixels between the left and right images. The disparity map may optionally be refined, e.g., to handle occlusions, noise, discontinuities, etc., using techniques such as filtering, weighted least squares, and/or the like.

It will be appreciated that when performing local stereo matching of image patches between frames using measures such as SSD, NCC, and/or the like to find a horizontal and/or vertical displacement {dx, dy} of pixels from one image to another that provides the best match, the same measure employed for the matching task may also be used to compute the match score. For example, to find correspondence between two image patches $\mathrm{Im}_1$ and $\mathrm{Im}_2$ using SSD measure, one may look for the displacement for which the following is minimized:

$$SSD = \sum_{x,y} (\mathrm{Im}_1(x, y) - \mathrm{Im}_2(x + dx, y + dy))^2,$$

where the summation is over all pixel coordinates x, y in the image patches. The minimum SSD value obtained, indicating a respective estimated displacement or motion vector providing the best match, may thus also be used to calculate a match score, optionally subject to normalization (e.g., according to the patches' size and pixel values range) of that minimum SSD value obtained, and subtraction of the resulting normalized value from 1, if scoring is desired to be in the range of [0, 1] where 1 stands for a perfect match and 0 for no match at all. Alternatively, the match score may be obtained by mapping an inverse of the minimum SSD value to the [0, 1] range using a trigonometric function, for example, as in the following:

$$\text{Score} = \frac{2}{\pi}\text{arc}tg\left(\frac{1}{minSSD}\right).$$

Similarly, if using NCC, one may look for a displacement for which the following is maximized:

$$NCC = \sum_{x,y} \frac{(\text{Im}_1(x, y) - \overline{\text{Im}_1}) * (\text{Im}_2(x + dx, y + dy) - \overline{\text{Im}_2}}{\sqrt{\sum_{x,y} (\text{Im}_1(x, y) - \overline{\text{Im}_1})^2} \sqrt{\sum_{x,y} (\text{Im}_2(x, y) - \overline{\text{Im}_2})^2}},$$

where $\overline{\text{Im}_1}$ and $\overline{\text{Im}_2}$ are the mean pixel values of the image patches respectively. The maximum NCC value denoting the best match, which is advantageously already normalized into the [0, 1] range, may also serve as the match score or confidence level for the estimated motion vector, as described and illustrated herein.

The disclosed subject matter provides for several advantages and/or improvements over pre-existing technologies.

One technical effect of utilizing the disclosed subject matter is that neither additional distance sensing hardware nor multiple cameras may be required, thus reducing production and deployment costs and complexity, and furthermore, minimizing or eliminating any excess weight so that flight resources may be conserved accordingly.

Another technical effect of utilizing the disclosed subject matter is that stereo sensitivity and/or resolution may be adjusted, for example, by changing amplitude of vertical (up and/or down) and/or lateral (left and/or right) motion and/or the like.

Yet another technical effect of utilizing the disclosed subject matter is improved robustness to difficult and/or poor vision conditions, since parameters of the perpendicular motion may be adjusted on the fly.

Other technical problems, solutions, and/or effects of the disclosed subject matter improved upon over pre-existing tools and/or techniques may be apparent from the detailed description herein.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an crasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
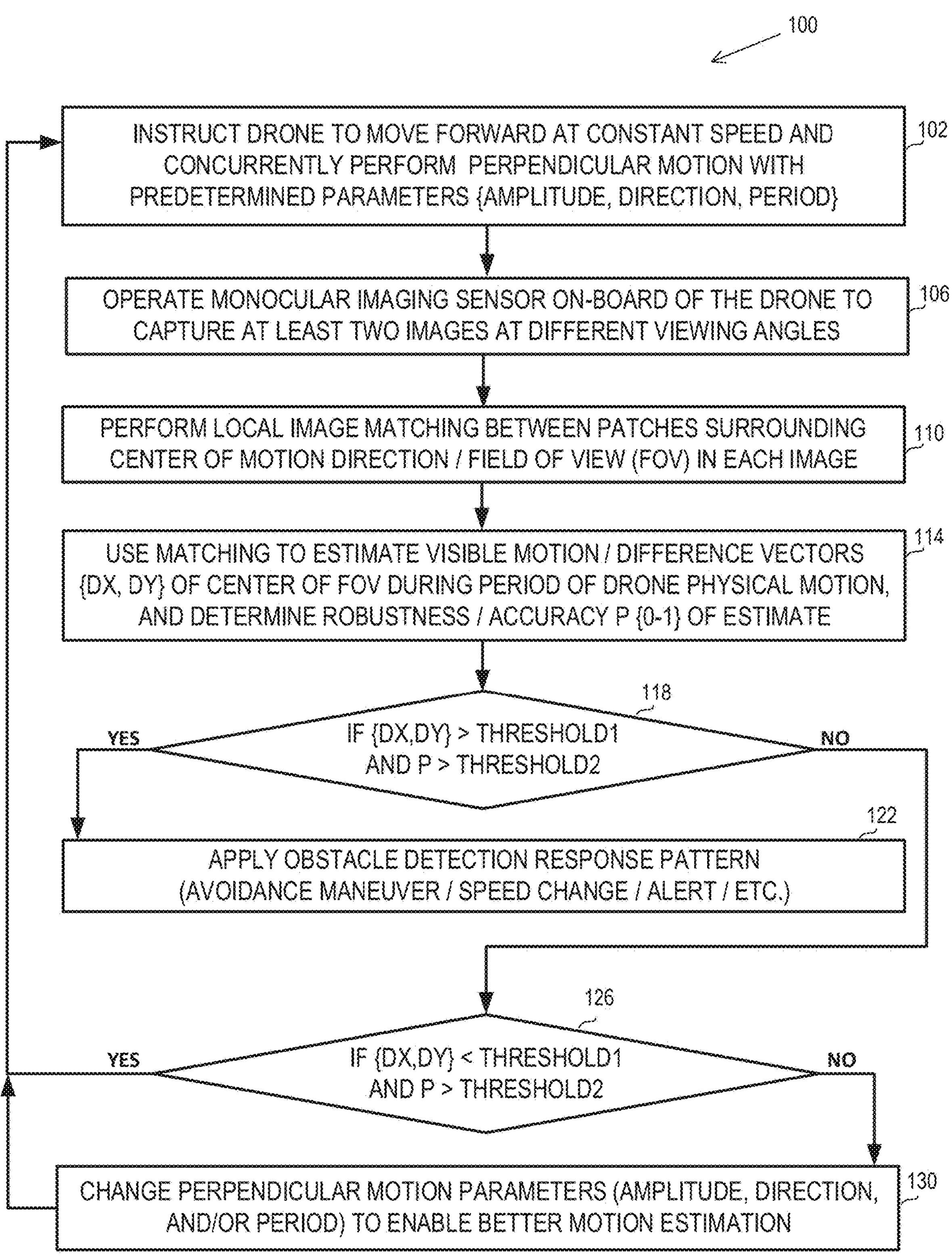
FIG. 1 is a flowchart illustrating an exemplary method for monocular obstacle detection on a drone flight path, according to some embodiments.

Reference is now made to FIG. 1 which is a flowchart illustrating an exemplary method for monocular obstacle detection on a drone flight path, according to some embodiments.

At 102, a drone may be instructed to move along a path in a forward direction at a constant speed and, while flying in the forward directed path, perform at least one planned motion in a direction perpendicular to the flight path, having known parameters. As one illustrative example, the forward motion and path may be horizontal, and the planned motion(s) may be lateral (left and/or right), vertical (up and/or down), and/or the like. Optionally the planned motion(s) may be periodic. The known parameters may include an amplitude, a direction, a period, and/or the like. The planned motion(s) parameters may be aimed at providing for additional and meaningful viewpoints of a region at the flight direction ahead and potential close by objects on one hand, without causing the drone deviating excessively from the original flight path on the other hand.

At 106, a monocular imaging sensor, e.g., a forward looking camera, mounted on board of the drone and adapted to capture images or video of a scene at a surrounding of the drone, may be operated to capture at least two images at different viewing angles, in accordance with the motion pattern of forward motion combined with (optionally periodic) lateral and/or vertical motion, as instructed at 102. For example, the at least two images or video frames may be captured at different times of a single period, where different offsets from the original path are reached by the drone. To illustrate, if a period of a perpendicular motion is T seconds, then the at least two images may be ones captured every T\2 seconds and/or the like.

At 110, for the at least two images or video frames captured at 106, local image matching may be performed between image patches near and/or around a central region of the forward motion direction and/or field of view (FOV) in one image or frame, and the respective central region in one or more other images or frames. The matching may be aimed at comparing contents (i.e., pixel values) of the image patches taken each from a different one of the at least two frames to detect similarities that may indicate identity of content depicted in both patches (i.e. correspondence of point(s) in one image patch to one(s) in the other).

At 114, the matching made at 110 may be used to estimate visible motion and/or difference vector {dx, dy} of the center of FOV between the two or more images captured during the period of the perpendicular (e.g., lateral and/or vertical) physical motion of the drone, as well as to determine a measure P of accuracy and/or robustness of the estimate (i.e., a confidence level or probability of correct identification), optionally normalized, i.e., taking values in the range from zero to one [0, 1]. The estimated motion vector {dx, dy} and associated measure P may then be evaluated in one or more subsequent steps against predetermined thresholds to assess an observed risk and/or probability of an object presence in the flight path at the current forward motion At 118, a determination may be made whether an estimated motion vector {dx, dy} as obtained at 114 exceeds in magnitude a first threshold denoted as Threshold1, and whether an associated accuracy and/or robustness measure P exceeds a second threshold denoted as Threshold2. An answer in the affirmative indicates that a relatively large motion is observed for the center of FOV and/or motion direction, and with sufficiently high likelihood, thus indicating an imminent probable risk of collision. The vector magnitude may optionally be defined as its Euclidean norm and/or length, i.e., square root of its dot product. Alternatively, other norms may be used, such as the Manhattan or Chebyshev distance, and/or the like.

At 122, a predetermined response pattern to positive obstacle detection as determined at 118 may then be applied, such as for example, providing instructions to the drone to perform avoidance maneuvers and/or change its speed, direction, and/or the like, issuing an alert, and so forth.

At 126, a determination may be made whether an estimated motion vector {dx, dy} as obtained at 114 does not exceed in magnitude the first threshold Threshold1, and the associated measure P exceeds the second threshold Threshold2. An answer in the affirmative indicates that no motion or a relatively small motion is observed for the center of FOV and/or motion direction, and with sufficiently high likelihood, thus indicating no imminent probable risk of collision. Accordingly, the process may return to 102 and continue as before.

At 130, as no probable detection of object presence or lack thereof had been made either at 118 and/or at 126, then one or more parameters of the perpendicular motion(s), e.g., amplitude, direction, period, and/or the like, may be changed in order to enable better motion estimation, and the process may thereafter be repeated from 102 through 130 with the new parameters, until successful detection (i.e., P>Threshold2) is achieved.

Figure 2:
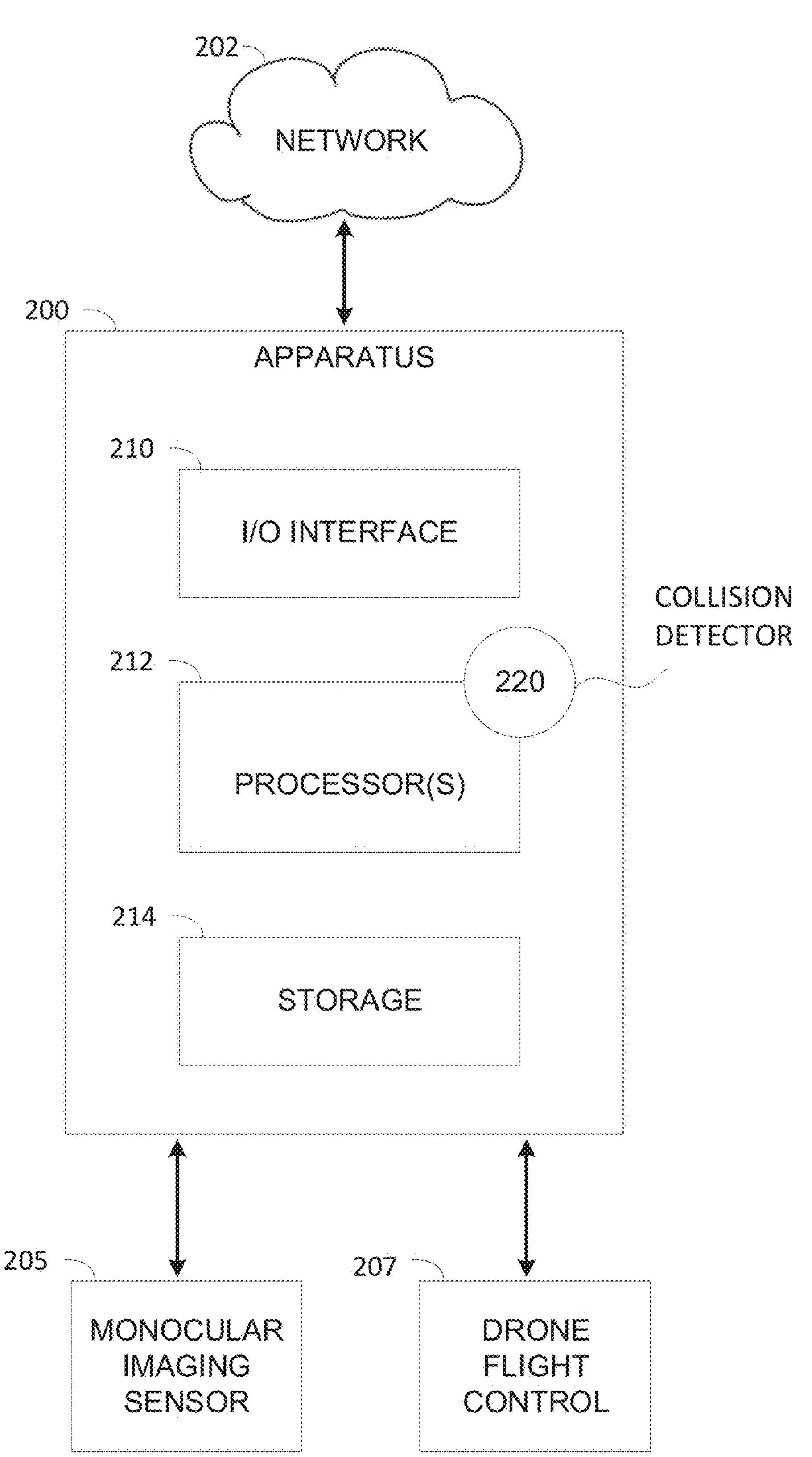
FIG. 2 is a schematic block diagram of an exemplary apparatus for monocular obstacle detection on a drone flight path, according to some embodiments.

Reference is now made to FIG. 2 which is a schematic block diagram of an exemplary apparatus for monocular obstacle detection on a drone flight path, according to some embodiments. An exemplary apparatus 200 may be used for performing one or more of the acts and/or operations for monocular obstacle detection on a drone flight path, such as described with reference to FIG. 1 herein.

The apparatus 200 may comprise, be coupled to, and/or communicate with a monocular imaging sensor 205 mounted on board of a drone and adapted to acquire images and/or video at a forward looking direction of a flight path of the drone. The monocular imaging sensor 205 may be, for example, a digital camera (e.g., using imaging devices sensitive to visible light such as charged-coupled devices (CCD) or complementary metal-oxide semiconductor (CMOS) chips), a thermal camera (e.g., using infrared (IR) radiation imaging devices), and/or the like.

The apparatus 200 may further comprise, be coupled to, and/or communicate with flight controls 207 of the drone to provide the drone with flight instructions and/or flight related parameters, such as for example, motion direction, speed, orientation (e.g., pitch and/or roll angles), and/or the like.

The apparatus 200 may comprise and/or be implemented as, for example, a controller, a computer, a control unit, and/or the like, which may include an Input/Output (I/O) interface 210 for connecting to one or more external devices, systems, services and/or the like, one or more processor(s) 212 for executing a process such as the method 100 as illustrated in FIG. 1, a storage 214 for storing data and/or code (program store), and/or the like.

The I/O interface 210 may include one or more wired and/or wireless I/O interfaces, ports, interconnections and/or the like for connecting to one or more external devices, for example, a Universal Serial Bus (USB) interface, a serial interface, a Radio Frequency (RF) interface, a Bluetooth interface and/or the like. Through the I/O interface 210, the apparatus 200 may communicate with one or more external devices (not shown) attached to the I/O interface(s), for example, an attachable mass storage device, an external media device and/or the like.

The I/O interface 210 may optionally further include one or more wired and/or wireless network interfaces for connecting to a network 202 comprising one or more wired and/or wireless networks, for example, a Local Area Network (LAN), a Wide Area Network (WAN), a Metropolitan Area Network (MAN), a cellular network, the internet and/or the like. Using the network interface(s) the apparatus 200 may communicate, optionally via the network 202, with one or more (optionally remote, e.g., networked) network resource(s) (not shown), which may optionally comprise and/or be implemented as, for example, a server, a computing node, a storage server, a networked database, a cloud service and/or the like.

The processor(s) 212, homogenous or heterogeneous, may include one or more processing nodes arranged for parallel processing, as clusters and/or as one or more multi core processor(s). The storage 214 may include one or more tangible, non-transitory persistent storage devices, for example, a hard drive, a Flash array and/or the like. The storage 214 may also include one or more volatile devices, for example, a Random Access Memory (RAM) component, a cache and/or the like. The storage 214 may further comprise one or more local and/or remote network storage resources, for example, a storage server, a Network Attached Storage (NAS), a network drive, a cloud storage service and/or the like accessible via the I/O interface 210.

The processor(s) 212 may execute one or more software modules such as, for example, a process, a script, an application, an agent, a utility, a tool, an Operating System (OS) and/or the like each comprising a plurality of program instructions stored in a non-transitory medium (program store) such as the storage 214 and executed by one or more processors such as the processor(s) 212. The processor(s) 212 may further include, utilize and/or otherwise facilitate one or more hardware modules (elements), for example, a circuit, a component, an integrated circuit (IC), an Application Specific Integrated Circuit (ASIC), a Field Programmable Gate Array (FPGA), a Digital Signals Processor (DSP), a Graphic Processing Units (GPU), an Artificial Intelligence (AI) accelerator and/or the like.

The processor(s) 212 may therefore execute one or more functional modules utilized by one or more software modules, one or more of the hardware modules and/or a combination thereof. For example, the processor(s) 212 may execute a collision detector functional module 220 for monocular obstacle detection on a flight path of the drone, in accordance with some embodiments.

The apparatus 200, communicating with one or more of the network resource(s) (not shown) and/or other likewise external devices (not shown), may therefore receive, fetch, collect and/or otherwise obtain data and information required for monocular obstacle detection on a flight path of the drone. Such data and information may include, for example, default or initial settings of perpendicular motions instructions to be performed (e.g., direction, amplitude, period, and/or the like), estimated motion vector magnitude and/or confidence level thresholds for determining obstacle presence, and/or the like. Optionally the apparatus 200 may communicate with one or more of the external devices and/or use the I/O interface 210 to output data and information to a user pertaining to results of the determination, such as for example, issuing an alert, reporting an action taken in response (e.g., an avoidance maneuver, a speed and/or direction change, etc.), and/or the like. For example, the apparatus 200 comprise, be coupled to, and/or communicate with (e.g., via the network 202 and/or otherwise through the I/O interface 210) one or more user terminal(s) (not shown), such as for example, a computer, a server, a laptop, a mobile device and/or the like used by one or more users, for example, an operator, a supervisor, a remote pilot of the drone, a flight inspector, and/or the like.

In another example, the I/O interface 210 of the apparatus 200 may comprise, be coupled to, communicate with, and/or otherwise be connected to one or more input and/or output (I/O) devices (not shown) for receiving input from and/or providing output to a user. Exemplary such I/O device(s) may comprise one or more of: a touchscreen, a display, a keyboard, a mouse, a touchpad, a microphone, a speaker, a camera, and/or the like. Additionally or alternatively, one or more standalone devices communicating with processor(s) 212, e.g., via the network 202, may serve as I/O device(s), such as for example, a mobile and/or stationary computing device such as a smartphone, a tablet computer, a desktop computer, and/or the like, running a suitable application program, may establish communication (e.g., cellular, network, short range wireless) with the processor(s) 212 using a communication interface (e.g., network interface, cellular interface, short range wireless network interface). The user may input data and/or receive data outputted by the respective device, e.g., by entering and/or viewing data on a display of a smartphone and/or likewise standalone device, optionally via a graphical user interface (GUI) such as may be presented by an operating system (OS) platform and/or an application program, and/or the like. The I/O device(s), whether integrated within the apparatus 200 or otherwise attached thereto, may be used by the respective users to interact with the collision detector 220.

The collision detector 220 may be adapted to provide instructions via the drone flight control 205 instructing the drone to fly forward along a specified flight path at a constant speed and while flying in the specified path perform at least one planned motion perpendicular to the flight path. The collision detector 220 may obtain one or more parameters associated with the at least one perpendicular motion, for example, as user input received via the I/O interface 210, as preprogrammed setting retrieved locally, e.g., from storage 214 and/or external device(s), and/or remotely via the network 202 from the network resource(s), and/or the like.

The collision detector 220 may be further adapted to operate the monocular imaging sensor 207 to capture at least two images and/or video frames at different viewing angles, e.g., at different times during a single period of the planned perpendicular motion, and/or the like.

The collision detector 220 may be adapted to extract potential close by objects in the forward motion direction of the flight path of the drone from successive frames obtained by the monocular imaging sensor 207 using stereo vision techniques.

For example, the collision detector 220 may perform stereo matching for the at least two images and estimate accordingly at least one motion vector between the matched images. For example, the collision detector 220 may perform local image matching between image patches near a central region of the field of view and/or motion direction of each frame. Optionally, the collision detector 220 may also determine according to the stereo matching a confidence level for a motion vector thus estimated.

The collision detector 220 may determine presence of an obstacle in the flight path at the forward motion direction according to the motion vector(s) estimated, and optionally further according to the confidence level determined. The collision detector 220 may apply at least one response pattern to eliminate and/or mitigate the collision risk, for example, the collision detector 220 may output an alert to a user via the I/O interface 210, provide instructions via the drone flight control 205 instructing the drone to perform avoidance maneuvers and/or change one or more of its flight parameters, e.g., speed, direction, etc., and/or any likewise collision avoidance patterns and/or responses.

Optionally, the collision detector 220 may determine a change to one or more parameters of the perpendicular motion(s), e.g., amplitude, direction, period, etc., based on the observed risk and/or probability of an obstacle at the flight path, and provide instructions via the drone flight control 205 instructing the drone to perform the perpendicular motion(s) with the new parameter(s). The collision detector 220 may continue adjusting the parameter(s) of the perpendicular motion(s) until successful detection is achieved.

Figure 3A:
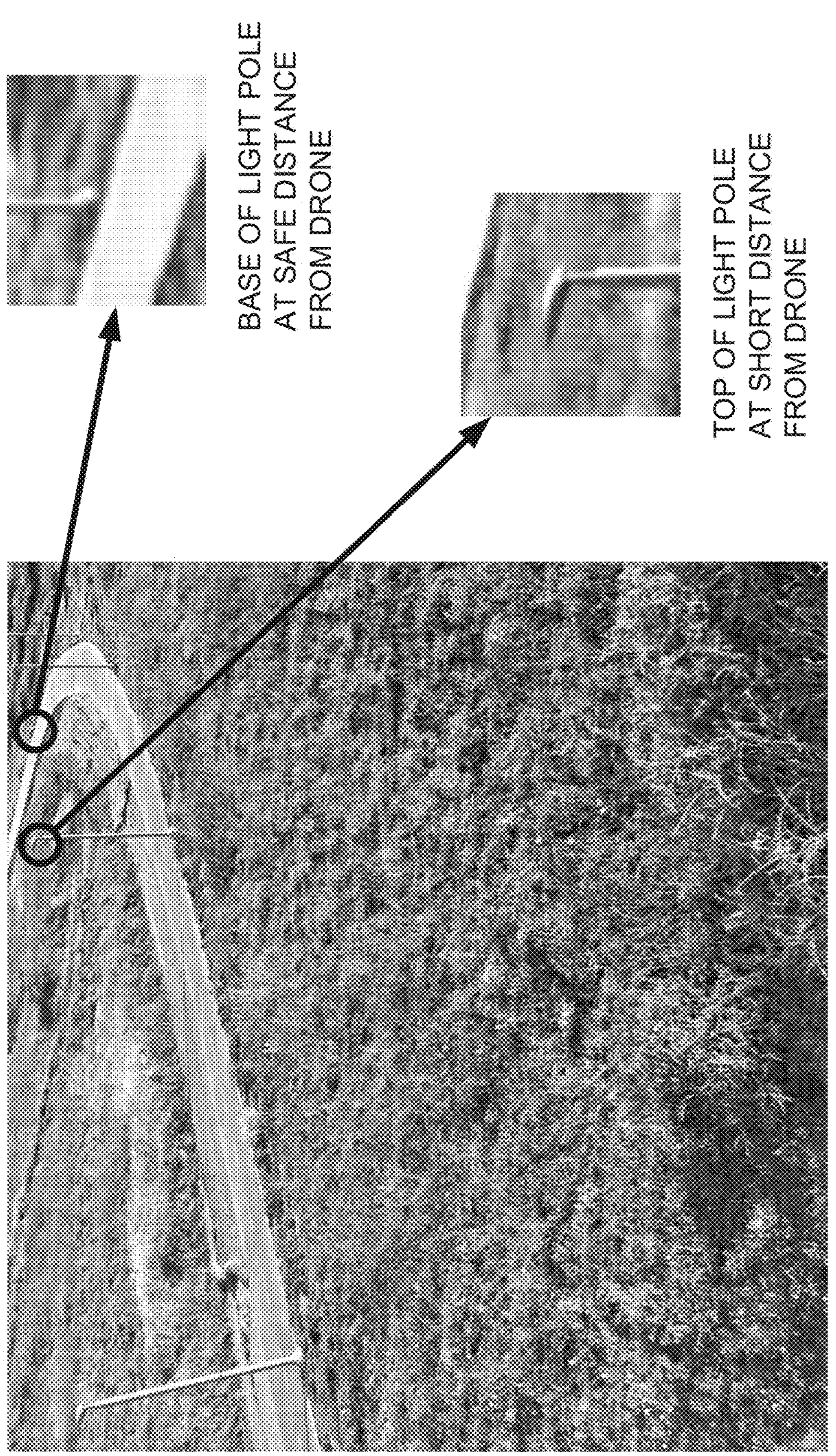
FIG. 3A is an exemplary image of potential obstacles captured by a monocular camera mounted on a flying drone, according to some embodiments.

Reference is now made to FIG. 3A which is an exemplary image of potential obstacles captured by a monocular camera mounted on a flying drone, according to some embodiments.

Figure 3B:
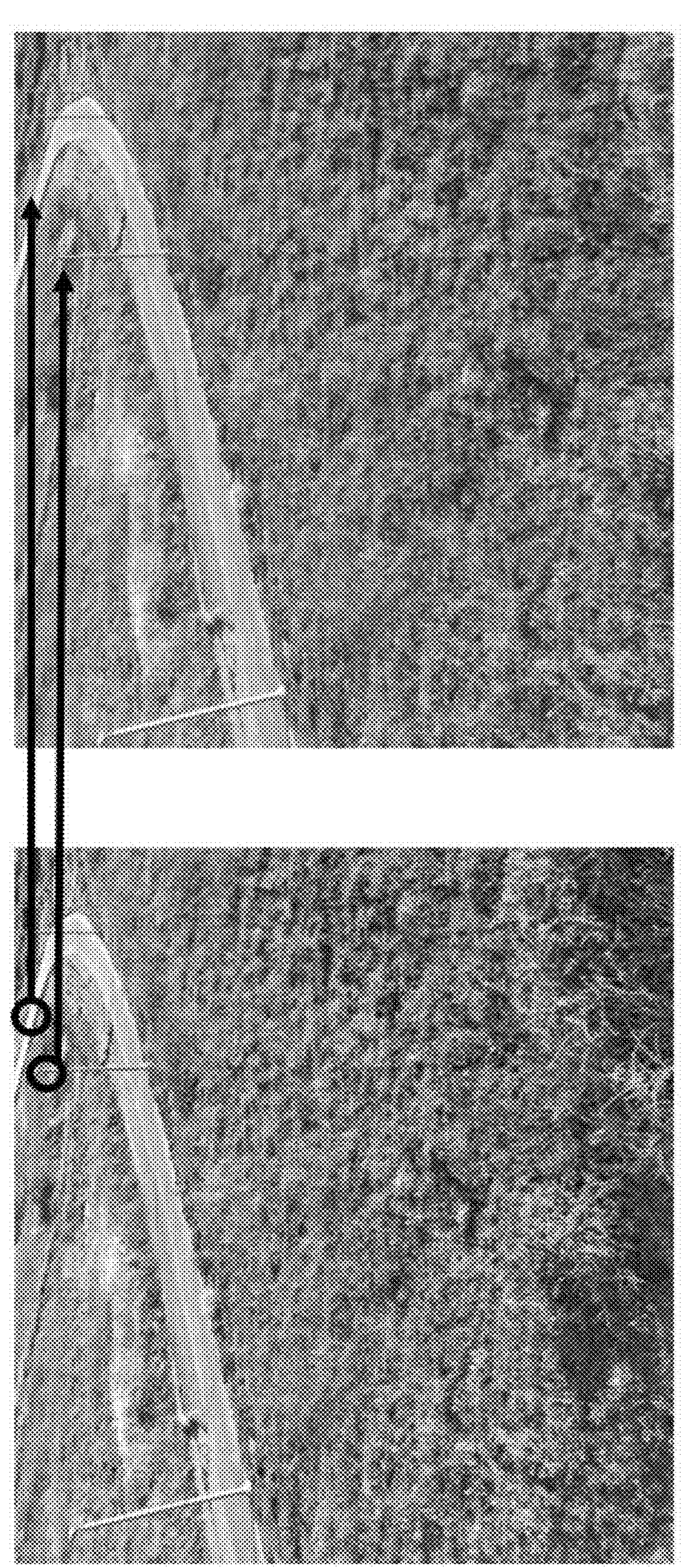
FIG. 3B is an exemplary pair of stereo matched successive images of potential obstacles captured by a monocular camera mounted on a flying drone, according to some embodiments.

Reference is also made to FIG. 3B which is an exemplary pair of stereo matched successive images of potential obstacles captured by a monocular camera mounted on a flying drone, according to some embodiments.

FIG. 3A shows an exemplary image captured by a monocular camera mounted on board of a drone during flight at low altitude above ground, depicting a rural scenery of a hilly terrain covered with vegetation and a winding road crossing it, with several lighting poles positioned at regular distances alongside the right border of the road. At the two enlarged details as further shown on FIG. 3A, there are depicted a base of one of the light poles which is located at a safe distance from the drone, and a top of another one of the light poles which is located at a short distance from the drone, respectively.

FIG. 3B shows a pair of successive images captured by the monocular camera during the same flight, where the image on the left is identical to the image on FIG. 3A, and the image on the right is one captured subsequently after the left image while the drone moving perpendicularly to the forward flight path. As shown on FIG. 3B, the top of the light pole at the short distance from the drone is mapped by the stereo matching to a position removed by 60 pixels downwards between the left and right images of the two successive frames, whereas the base of the other light pole at the more distant location is mapped to a position removed by less than 10 pixels.

Reference is now made to FIG. 4 which is a schematic illustration of estimated motion vectors for monocular obstacle detection on a drone flight path as obtained in an exemplary scenario of no obstacle present, according to some embodiments.

Reference is also made to FIG. 5 which is a schematic illustration of estimated motion vectors for monocular obstacle detection on a drone flight path as obtained in an exemplary scenario of an obstacle present, according to some embodiments.

FIGS. 4 and 5 each show exemplary results of motion vectors estimated for a central region of a forward motion direction and/or field of view using successive frames obtained by a monocular camera. For illustration purposes and demonstration of scale, there are also shown estimations of motion vectors at farther regions surrounding the central region.

As shown on FIG. 4 depicting a tunnel ride, where no obstacle is present at the path forward, the vectors near the center of the field of view, which is also the movement direction, are relatively small, or even zero if very distant.

Conversely, as shown on FIG. 5, depicting a road from a motorist view with an obstacle in form of a truck right ahead, the vectors near the center of the field of view, which is also the movement direction, are large.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant drone and/or imagery technologies will be developed and the scope of the terms "drone" and "imaging sensor" is intended to include all such new technologies a priori.

As used herein the term "about" refers to +10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for monocular obstacle detection on a drone flight path, comprising:

instructing a drone to move at a constant speed on a flight path directed forward along a horizontal axis;

instructing the drone while moving at the constant speed forward on the flight path to periodically perform a planned motion of a predefined amplitude in at least one direction perpendicular to the horizontal axis;

operating a forward-looking monocular camera mounted on the drone to capture at least one pair of images, each pair comprising a first frame captured along the flight path and a second frame captured at a deviation from the flight path effected by the planned motion performed in the at least one direction;

analyzing the first and second frames of a respective one of the at least one pair to determine stereo matching;

estimating for at least one region of interest a motion vector between the first and second frames according to the stereo matching; and in response to determining according to the motion vector that an obstacle is present on the flight path, applying at least one obstacle detection response pattern.

2. The method of claim 1, wherein at least one parameter of the planned motion is adjusted in response to determining according to the motion vector that an obstacle is potentially present on the flight path.

3. The method of claim 1, wherein the determining according to the motion vector that the obstacle is present on the flight path comprises performing a comparison between a magnitude of the motion vector and a threshold.

4. The method of claim 1, further comprising:

determining a confidence level of the motion vector estimated; and performing a comparison between the confidence level and a threshold, wherein the determining according to the motion vector that the obstacle is present on the flight path is subject to the confidence level exceeding the threshold.

5. The method of claim 4, wherein at least one parameter of the planned motion is adjusted in response to the confidence level not exceeding the threshold.

6. The method of claim 1, wherein the at least one region of interest contains a center of a field of view of the monocular camera.

7. The method of claim 1, wherein the at least one obstacle detection response pattern comprises a member selected from a group consisting of: instructing the drone to perform an obstacle avoidance maneuver; instructing the drone to change at least one of a speed and a course of the drone; and outputting an alert.

8. The method of claim 1, wherein the monocular camera is of a type selected from a group consisting of: a visible light camera; and a thermal infrared camera.

9. The method of claim 1, wherein at least one parameter of the perpendicular motion is changed dynamically based on results of previous object detection.

10. The method of claim 9, wherein said at least one parameter is selected from a group consisting of direction, frequency and amplitude.

11. An apparatus for monocular obstacle detection on a drone flight path, comprising:

a processing circuitry adapted for:

instructing a drone to move at a constant speed on a flight path directed forward along a horizontal axis;

instructing the drone while moving at the constant speed forward on the flight path to periodically perform a planned motion of a predefined amplitude in at least one direction perpendicular to the horizontal axis;

operating a forward-looking monocular camera mounted on the drone to capture at least one pair of images, each pair comprising a first frame captured along the flight path and a second frame captured at a deviation from the flight path effected by the planned motion performed in the at least one direction;

analyzing the first and second frames of a respective one of the at least one pair to determine stereo matching;

estimating for at least one region of interest a motion vector between the first and second frames according to the stereo matching; and in response to determining according to the motion vector that an obstacle is present on the flight path, applying at least one obstacle detection response pattern.

12. The apparatus of claim 11, wherein at least one parameter of the planned motion is adjusted in response to determining according to the motion vector that an obstacle is potentially present on the flight path.

13. The apparatus of claim 11, wherein the determining according to the motion vector that the obstacle is present on the flight path comprises performing a comparison between a magnitude of the motion vector and a threshold.

14. The apparatus of claim 11, wherein the processing circuitry is further adapted for:

determining a confidence level of the motion vector estimated; and performing a comparison between the confidence level and a threshold, wherein the determining according to the motion vector that the obstacle is present on the flight path is subject to the confidence level exceeding the threshold.

15. The apparatus of claim 14, wherein at least one parameter of the planned motion is adjusted in response to the confidence level not exceeding the threshold.

16. The apparatus of claim 11, wherein the at least one region of interest contains a center of a field of view of the monocular camera.

17. The apparatus of claim 11, wherein the at least one obstacle detection response pattern comprises a member selected from a group consisting of: instructing the drone to perform an obstacle avoidance maneuver; instructing the drone to change at least one of a speed and a course of the drone; and outputting an alert.

18. The apparatus of claim 11, wherein the monocular camera is of a type selected from a group consisting of: a visible light camera; and a thermal infrared camera.

19. A computer program product comprising:

a non-transitory computer readable storage medium;

program instructions for executing, by a processor, a method for monocular obstacle detection on a drone flight path, the method comprising:

instructing a drone to move at a constant speed on a flight path directed forward along a horizontal axis;

instructing the drone while moving at the constant speed forward on the flight path to periodically perform a planned motion of a predefined amplitude in at least one direction perpendicular to the horizontal axis;

operating a forward-looking monocular camera mounted on the drone to capture at least one pair of images, each pair comprising a first frame captured along the flight path and a second frame captured at a deviation from the flight path effected by the planned motion performed in the at least one direction;

analyzing the first and second frames of a respective one of the at least one pair to determine stereo matching;

estimating for at least one region of interest a motion vector between the first and second frames according to the stereo matching; and in response to determining according to the motion vector that an obstacle is present on the flight path, applying at least one obstacle detection response pattern.

* * * * *